C. A. Postley.
Grain Meter.
N° 13,397. Patented Aug. 7, 1855.

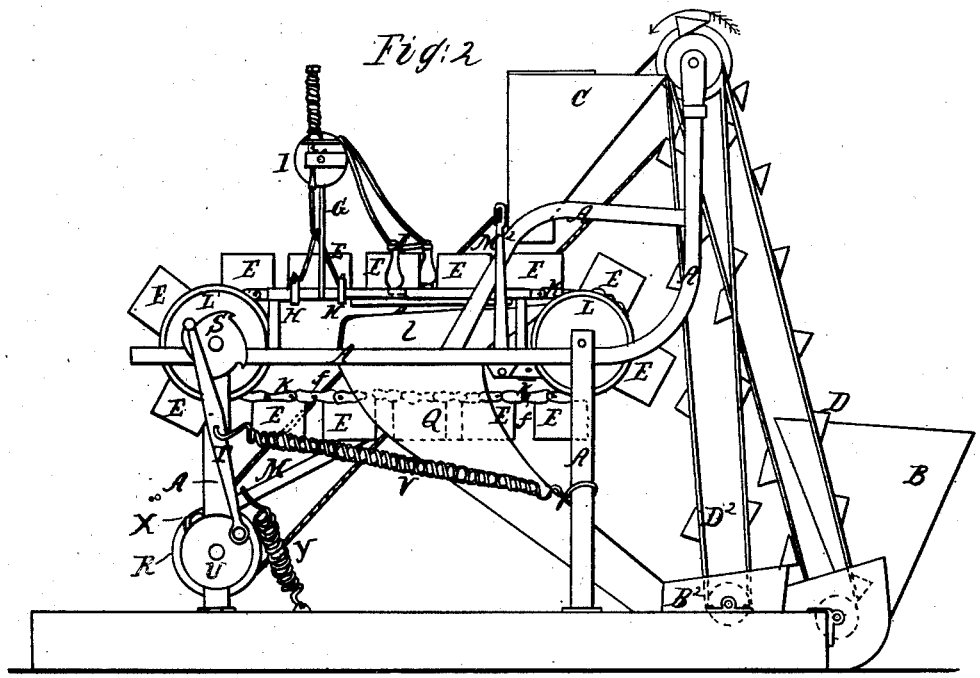

UNITED STATES PATENT OFFICE.

CHARLES A. POSTLEY, OF PHILADELPHIA, PENNSYLVANIA.

MACHINE FOR MEASURING AND WEIGHING GRAIN.

Specification of Letters Patent No. 13,397, dated August 7, 1855.

*To all whom it may concern:*

Be it known that I, CHARLES A. POSTLEY. of the city of Philadelphia, in the county of Philadelphia and State of Pennsylvania, have invented a new and useful Machine for Measuring and Weighing All Kinds of Grain at the Time of Removing or Hoisting it into the Mill, Storehouse, or Vessel; and I do hereby declare that the following is a full, clear, and exact description of the same, with its manner of operation, reference being had to the annexed drawings, making a part of this specification, in which—

Figure 1:
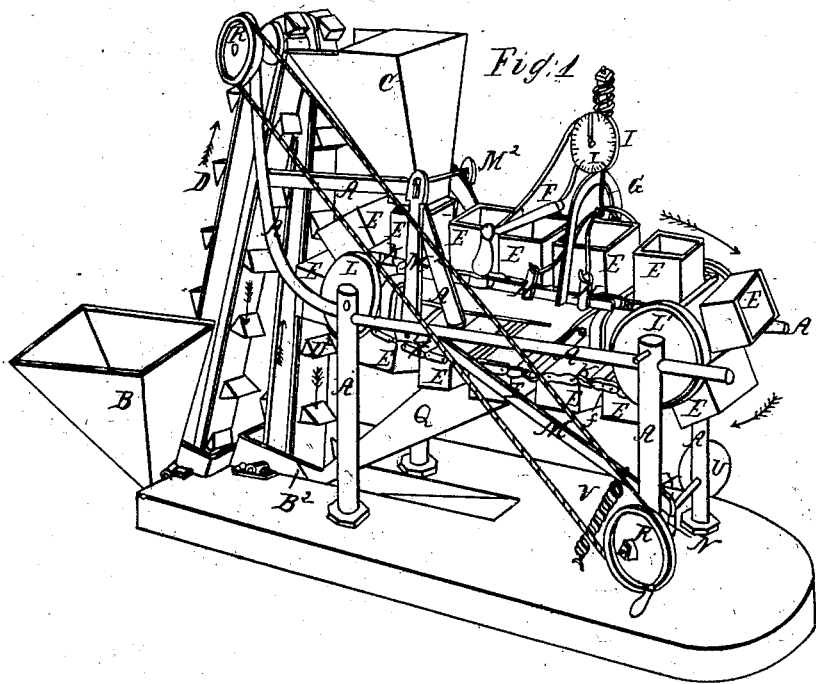
Figure 3:
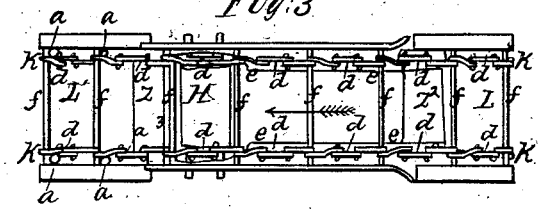
Figure 4:
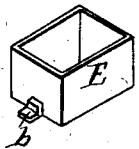
Figure 5:
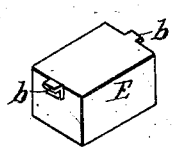
Figure 6:
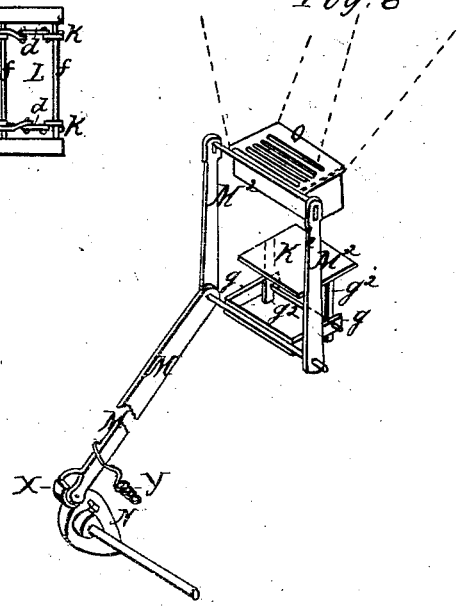

Figure 1, is a perspective view; Fig. 2, a side elevation; Fig. 3, a top plan, of the rollers, endless chain, platform of the scale; apron, for receiving buckets, or measures, from platform of scale; and platform of valve, regulating levers, the buckets, or measures, being removed, in order to more fully show, the arrangement of the various parts; Figs. 4, and 5, perspective views, of a bucket, or measure, detached; Fig. 6, a perspective view, of the supply, or feed valve O, and valve seat P, with the levers, M, and M², friction roller X, and cam N, together with feed valve regulating levers, $g, g$, connecting rods, $g^2, g^2$, and platform $Z^2$; Fig. 7, a side elevation of the cam N; Fig. 8, a perspective view, of the supply or feed valve O, and Fig. 9, a perspective view, of the supply or feed valve seat, P. The dotted lines in Figs. 6, and 9, represent a part of the feed hopper; similar letters refer to like parts.

The invention consists in a new and improved combination of parts, for the purpose of measuring, and weighing, all kinds of grain, and giving the weight, of every bushel, as measured, at the time of removing, hoisting, or transferring it into the mill, storehouse, vessel, or other receptacle.

A, is a frame, constructed of iron or any suitable material, and in any proper manner for the support of the working parts; B, is intended, in the drawings, to represent the hold of a vessel, wagon, or reservoir of any kind, and not intended as having any connection in the combination of the machine, other than to show from where the grain is supplied; B², waste grain hopper; C, is the feed hopper, from which the buckets, or measures, are filled as they pass under its mouth; D, and D², elevators, similar in all respects to the elevators in common use, and connected, in drawings only for the purpose of showing the manner of feeding the machine, and not claimed, as forming any part or parts, in the combination of machine; the machine can be supplied in various ways, without the aid of elevators; elevators D, work from reservoir B, and supply the feed hopper C; elevators D², carry and return the waste grain, from waste hopper B², to feed hopper C; E, buckets or measures, in which the grain is measured and carried forward, passing under the strike, they being arranged to contain one bushel, or any given quantity to the scale and weighed; F, strike fastened to frame A, and placed diagonally across the mouth of bucket or measure E, for striking off the surplus grain from buckets or measures, as they pass under it; G, scale supporter; H, scale bottom; I, dial, operated upon by means of ratchet and pinion, which may be arranged so as to be placed under, the scale bottom, scale bottom resting on the weighing apparatus, in place of being suspended as in drawings; K, an endless chain, passing over rollers, at either end of the framing, the links of the chain being constructed in such a manner (as shown in Fig. 3,) that the ear at each end of the bucket or measure, falls into a catch $d$, which securely holds, it in its place, carrying it forward as the chain advances; L, and L', rollers, over which the endless chain passes; the roller marked L', has four catches at each end; two of them are shown in Fig. 3, and marked $a, a$; their object is to seize hold of the ends of the chain stretchers marked $f, f$, and carry the chain forward.

M, and M², are valve levers, which govern the motion of the valve O, causing it to open or shut as occasion requires; N, cams fixed on driving shaft, and operating directly upon the lever M; O, the valve, and P, the valve seat, fixed in mouth of hopper C, to regulate the supply of grain; Q, waste pipe, for carrying the grain swept off from buckets, or measures, by the strike F, to the waste grain hopper; the pipe is made with a large mouth as shown at $l$, Fig. 2, in order more effectually to receive the scattering grain; R, R, pulleys, for working elevators to supply machine; S, a ratchet or dog wheel, fixed on the end of roller L', and acted upon by the connecting rod T; T, a connecting rod, upon the upper end of which is a projecting catch or dog, working in the ratchet or dog wheel S, while its lower end works in a slot in the periphery of the crank wheel U; U, crank wheel, attached to and on the opposite end of the same shaft upon which the cam N, works; V, spiral spring, which retains the connecting rod T, in its proper position.

X is a friction roller, fixed in a jaw on the lower end of the lever M, and resting upon the cam N, as shown in Fig. 6; Y, spiral spring, governing the lever M; both spiral springs, may be dispensed with, and their places supplied by cords and weights; $a, a$, catches on the roller L', by which means the chain is carried forward; $b$, ears on the bottom part of the ends of the buckets, or measures; they serve to retain the buckets, or measures, in their places, while being carried forward, and also prevent them from falling, from the chain, when inverted, and during their passage to the hopper C, to be refilled; the chain is constructed, as shown in Fig. 3, in squares, or segments of sufficient size as to admit, the buckets, or measures to work free; each square or segment is formed by the chain stretchers $f, f$, and three flat links, connected by bolts, so as to form the catch $d$, for the reception of the ears $b$; $e, e$, are rails, supported by frame A, and upon which the chain and buckets, or measures, rest, while being carried forward; were it not for this or some similar arrangements the buckets, or measures, would fall through the chain, and it may be as well to state now, that the buckets, or measures, can only be put in their proper places, in the chain, from below; $g, g$, are levers, attached to the shaft or fulcrum, of levers M, and $M^2$; $g^2$, $g^2$, are connecting rods, supporting platform $Z^2$, and are connected with levers $g, g$, for the purpose of controlling or regulating the supply valve O; $Z^2$, platform of regulating levers $g, g; f, f$, chain stretchers, as shown in Fig. 3; Z, is an apron upon which the buckets, or measures, rest after passing forward from scale, it is placed at an inclination the part marked 3, in the drawing being slightly depressed in order to receive the bucket, or measure, as it passes forward from the platform of scale, without jar or shock.

The machine being put in motion, its operation is as follows: The elevators D, carry the grain from reservoir B, to the feed hopper C, by means of pulleys R, R, from whence it passes into the buckets, or measures, E, as they are successively brought under its mouth, by means of crank wheel U, to which connecting rod T, is attached for the purpose of operating on ratchet or dog wheel S, in connection with roller L', all of which being so connected as at every revolution of the shaft upon which crank wheel U, is affixed, causes the catch or dog, on the end of connecting rod T, to fall in to ratchet or dog wheel S, fixed on roller L', which in its turn operates by means of catches $a, a$, upon chain stretchers $f, f$, and thus causing the chain K, to be brought forward so far as to remove the bucket, or measure, E, from under hopper C, passes a bucket, or measure, under strike F, and at the same time places a bucket, or measure, on the scale, to be weighed; the filling and weighing, of buckets or measures, being accomplished while the crank wheel U, is performing the opposite turn of the revolution; the supply of grain from hopper C, is governed by the valve O, by means of levers M, and $M^2$, levers M, and $M^2$, being operated on by the cam N, causing the valve to remain open while the bucket or measure under the mouth of hopper C, is being filled and the bucket, or measure, on the scale, is being weighed, and closing it during the passage of the buckets, or measures, onward, and all which being so connected and arranged as that at each revolution of the shaft, upon which cam N, and crank wheel U, is fixed, places a bucket or measure, under hopper C, passes a bucket or measure, under strike F, at the same time places a bucket, or measure on scale, to be weighed, opens valve O, in mouth of hopper C, which in its turn fills bucket, or measure, under hopper C, closes valve O, and sends buckets, or measures, forward; the cam N, may be so shaped as to attain a fast or slow speed.

As the buckets or measures, pass under the strike F, the surplus grain is struck off even with the top of measure, thus giving the bushel or quantity required to be weighed, the surplus falling into the mouth $l$, of the waste pipe Q, through which it passes into the waste grain hopper $B^2$, and is carried up again by means of the elevators marked $D^2$; the mouth $l$, of and the waste pipe Q, can be so constructed as to be placed under the inverted buckets, or measures, E, so as to receive not only the grain struck off by strike F, but also any grain that may fall from any of the buckets or from hopper C; as the buckets or measures are carried forward, each one in its turn falls upon the platform of the scale, the bucket, or measure, being no longer supported by the rails $e, e$, the scale being in construction similar to the common spring scale; the moment the bucket or measure with the measured grain in it, rests upon the platform of scale, it causes it to descend so far as that the two ends $b, b$, of buckets or measures E, will fall below and clear of chain K, but not so far as to prevent the chain in its onward motion from catching the inner projection of the ends $b, b$, of buckets, or measures E, the inner projection of ends $b, b$, being intended for the above purpose, to wit, catching the chain after the bucket or measure is filled from hopper C, or weighed on scale, so as to bring the bucket or measure, in its proper place in the chain K, the outer projection being intended to keep the buckets or measures in their position in the chain while revolving on rollers, L, and L', and when in an inverted position, platform of scale, with bucket or measure, containing the measured grain on it, in its turn acting by means of the rack and pinion upon the index, carries it around the dial, thus showing the weight of the measured grain; after being weighed the forward motion of the chain K, forces the bucket or measure, up the apron Z, which is slightly inclined below the platform of scale, and thus gradually raises the bucket or measure, in its onward course, into its proper place in the chain K, so that the outer projection of the ends $b$, $b$, of buckets or measures, E, catch for their purposes, the inner projection of the ends $b$, $b$, of buckets or measures E, and the catch in chain K, may be made square or round; the cam N, is triangular in shape as shown in Fig. 7, and operates as follows: Supposing the cam to be in a position that the part marked, 1, shall be at the top, as the shaft revolves in the direction of the arrow, the point gradually reaches the position marked 1, in the drawing, during which time the valve O, remains closed, while the buckets, or measures, pass forward and the grain is discharged.

In order to meet the various rates of speed that may be required or used in the machine, or its stoppage at any stage of its operation, and to prevent an overflow of bucket, or measure, from hopper C, a movable platform marked $Z^2$, is placed under the mouth of hopper C, and on which bucket, or measure, E, rests when under the mouth of hopper C, which platform is supported by two upright connecting rods, $g^2$, $g^2$, connected with levers $g$, $g$, and which are again connected with levers M, and $M^2$, acting upon valve O, the effect and action of which is, as the grain descends from hopper C, to bucket, or measure, E, to depress, by its weight platform $Z^2$, which by means of levers, $g$, $g$, and $M^2$, closes valve O, in mouth of hopper C, as soon as the requisite quantity of grain for each bushel is in the bucket, or measure, it will depress the platform $Z^2$, and by the action of levers above mentioned will close valve O; levers $g$, $g$, and M, and $M^2$, being in their power sufficient to keep valve O, open until the weight of grain in bucket, or measure, E, overbalance it; the object, and intention of platform $Z^2$, in connection with the levers $g$, $g$, and $M^2$, being to close the valve O, by the weight of grain in bucket, or measure, E, on platform $Z^2$, whenever by the stoppage of the machine the cam N, would not act on lever M, to close valve O; in other words, the levers $g$, $g$, and $M^2$, are to close the valve O, by weight of grain in bucket, or measure, on platform $Z^2$, and prevent an overflow of grain from hopper C, whenever lever M, by stoppage of machine or any other cause, should fail to close it; all of the within described parts, of machine can be made of iron or any other suitable metal.

What I claim as my invention and desire to secure by Letters Patent is—

1. The combination, substantially as and for the purpose above set forth and described, of the weighing mechanism or its equivalent with the series of measures upon an endless chain which carries them in succession under the hopper, under the strike and over the scales.

2. I am aware that in grain weighing machines the cut off has been so arranged that it is operated by the weight of the grain received in the hopper and when the desired weight is attained, this therefore broadly, I do not claim, but what I do claim is the combination with the lever $M^2$ and valve O, respectively, of the lever M, operated by the cam N, or its equivalent, and of the platform $Z^2$ and levers $g$, and $g^2$ by which the said valve may be operated by the motive power of the machine, or failing this at any time, by the weight of the grain itself, substantially as above set forth and described.

CHARLES A. POSTLEY.

Witnesses:
 CHARLES D. FREEMAN,
 MASON NAYLOR.